(12) United States Patent
Liu et al.

(10) Patent No.: US 7,489,874 B2
(45) Date of Patent: Feb. 10, 2009

(54) METHOD AND APPARATUS FOR DEMODULATION OF OPTICAL DIFFERENTIAL PHASE SHIFT KEYED SIGNALS

(75) Inventors: Xiang Liu, Marlboro, NJ (US); Xing Wei, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 596 days.

(21) Appl. No.: 11/068,349

(22) Filed: Feb. 28, 2005

(65) Prior Publication Data

US 2006/0193639 A1 Aug. 31, 2006

(51) Int. Cl.
*H04B 10/00* (2006.01)

(52) U.S. Cl. ..................................... 398/161
(58) Field of Classification Search ................. 398/161, 398/183
See application file for complete search history.

(56) References Cited

U.S. PATENT DOCUMENTS

2004/0240888 A1* 12/2004 Leuthold et al. ............. 398/149
2005/0265733 A1* 12/2005 Kao et al. .................... 398/188

OTHER PUBLICATIONS

Y. Miyamoto et al., "Novel Modulation and Detection for Bandwidth-Reduced RZ Formats Using Duobinary-Mode Splitting in Wideband PSK/ASK Conversion", *Journal of Lightwave Technology*, vol. 20, No. 12, Dec. 2002, pp. 2067-2078.

A. H. Gnauck, "40-Gb/s RZ-Differential Phase Shift Keyed Transmission", *Proc. OFC'03*, vol. 2, paper ThE1, 2003, pp. 450-451.

X. Liu, "Nonlinear Effects in Phase Shift Keyed Transmission", *Proc. OFC'04*, paper ThM4, 2004.

X. Liu et al., "Tolerance to In-Band Coherent Crosstalk of Differential Phase-Shift-Keyed Signal With Balanced Detection and FEC", *IEEE Photonics Technology Letters*, vol. 16, No. 4, Apr. 2004, pp. 1209-1211.

P. J. Winzer et al., "Degradations in Balanced DPSK Receivers", *IEEE Photonics Technology Letters*, vol. 15, No. 9, Sep. 2003, pp. 1282-1284.

C. Rasmussen et al., "DWDM 40G Transmission Over Trans-Pacific Distance (10,000 km) Using CSRZ-DPSK, Enhanced FEC, and All-Raman-Amplified 100-km Ultra Wave Fiber Spans", *Journal of Lightwave Technology*, vol. 22, No. 1, Jan. 2004, pp. 203-207.

G. Bosco et al., The Effect of Receiver Imperfections on the Performance of Direct-Detection Optical Systems Using DPSK Signals, *Proc. OFC'03*, vol. 2, paper ThE6, 2003, pp. 457-458.

European Search Report dated Oct. 5, 2006 for European Patent Application No. 06250734.8-2415.

* cited by examiner

Primary Examiner—Quan-Zhen Wang (57) ABSTRACT

Method and apparatus for demodulating one or more channels of an optical differential phase shift keyed (DPSK) signal with a symbol rate of SR using an athermal optical delay interferometer with a free spectral range (FSR) of 50 GHz/$2^N$, and $(0.8 \times SR) < FSR < (1.3 \times SR)$, where $N = 0, 1, 2 \ldots$.

29 Claims, 8 Drawing Sheets

METHOD AND APPARATUS FOR DEMODULATION OF OPTICAL DIFFERENTIAL PHASE SHIFT KEYED SIGNALS

FIELD OF THE INVENTION

The present invention relates generally to the field of optical communications, and more specifically to an apparatus and method for demodulating differential phase shift keyed optical signals.

BACKGROUND OF THE INVENTION

Optical differential phase-shift keying (DPSK) is a promising modulation format that offers high receiver sensitivity, high tolerance to major nonlinear effects in high-speed transmissions, and high tolerance to coherent crosstalk. Optical DPSK modulation includes differential binary phase shift keying (DBPSK), differential quadrature phase shift keying (DQPSK), and other related format variants.

In optical DPSK transmission, data information is carried by the optical phase difference between adjacent bits. For direct detection of an optical DPSK signal by conventional intensity detectors a demodulator for converting the phase-coded signal into an intensity-coded signal is needed. Such a demodulator is typically a delay interferometer. The free spectral range (FSR) of the interferometer is the inverse of the delay. In optical 1-bit delay interferometers (O-1bit-DI), the FSR is equal to the SR, where SR is the symbol rate of the DPSK signal to be demodulated.

The SR of an OC-768 DBPSK signal is usually 40 GHz (or 42.7 GHz when a 7% overhead is used to for forward-error correction), and the SR of an OC-768 DQPSK signal is usually 20 GHz (or 21.3 GHz). In wavelength-division multiplexed (WDM) systems which adhere to ITU-T Recommendation G.692, the minimum frequency channel spacing between two WDM channels on the ITU grid is 50 GHz, which is not equal to the FSR of a O-1bit-DI commonly used for decoding OC-768 DBPSK signals as discussed above. Thus, an O-1bit-DI cannot be used for demodulating any one of the channels on the ITU grid without readjusting (i.e. tuning) the passband center frequency of the O-1bit-DI. The center frequency readjustment requires sophisticated monitoring and feedback control, which increases the complexity and cost for the DPSK demodulation.

Conventional O-1bit-DIs are typically based on an all-fiber designs or planar lightwave circuit (PLC) designs. These designs are intrinsically temperature sensitive since the index of refraction of the material used to construct these interferometers (i.e. the optical paths) is temperature dependent. Thus, the temperature-induced optical phase changes of signals propagated in the optical paths of the ODI, which are different in length in order to obtain the 1-bit delay, are different. Consequently, precise control of the phase difference between the two optical paths of the ODI is required. To precisely control the phase difference between the optical paths, accurate temperature control and stabilization of the ODI are required, which significantly adds to the cost and complexity of the ODI.

SUMMARY OF THE INVENTION

The present invention provides an apparatus and method for demodulating optical DPSK signals. One aspect of the invention involves the recognition that the FSR of an ODI for demodulating optical DPSK signals is not necessarily equal to the SR of the DPSK signal, while still providing acceptable demodulation performance. Specifically, the FSR and SR can differ by about ±25% without causing a substantial demodulation penalty. Thus, for example, the FSR of an ODI can be set to $50/2^N$ GHz (where N=0, 1, 2 ... ) to allow the demodulation of different WDM channels with frequency spacings that are multiples of 50 GHz without any readjustment of the ODI.

Another aspect of one embodiment of the invention involves the recognition that an ODI with an FSR larger than the SR of the signal to be demodulated has a higher tolerance to frequency drift (due to signal laser frequency drift and/or ODI passband misalignment).

Another aspect of the invention involves the recognition that it is desirable in real-world systems to make the ODI "non-tunable" so that there is no need for monitoring and feedback control, and the complexity and cost of the systems can be reduced. The non-tunable ODI can be realized using, for example, using free-space-optics based designs.

It is also recognized that while non-tunable ODIs offer simplicity and cost-effectiveness, their passbands can not be tuned or adjusted, thus limiting their use to demodulating a predefined group of channels. One embodiment of the invention provides a non-tunable ODI adapted to produce a phase difference between the optical paths of the ODI, which is a multiple of $\pi$ within an accuracy of $\pm\pi/6$ at 193.100 THz (193.100 THz being the reference frequency for the frequency grid adopted by the ITU). This allows the ODI to work for all ITU grid channels. (As used herein such an ODI with an FSR of 50 GHz and its passband locked onto the ITU grid is referred to as a "50-GHz-ODI").

Furthermore, an ODI in accordance with the invention can demodulate multiple DPSK WDM channels simultaneously. Additionally, it can also be used to demodulate a DPSK signal whose center frequency is dynamically tuned to different ITU channels.

In a further embodiment of the invention, the ODI is an athermal design that is substantially temperature-independent, so no temperature control and stabilization are needed. The athermal design can be based on, for example, a free-space optical Michelson interferometer whose two optical paths are in free space or in material(s) with extremely low thermal expansion coefficients(s). In effect, the use of free-space optics allow one to utilize materials with much lower thermal expansion coefficient than $SiO_2$ (as in fiber and PLC based devices).

Potential advantages of using an ODI according to embodiments of the invention also include the ability to unambiguously determine the data and the inverted data outputs from the ODI, no need for sophisticated monitoring and feedback control to lock onto channel frequencies, and compatibility with dynamically wavelength tuned signal transmission. Additionally, ODIs according to embodiments of the invention can be used in systems where the channel count is increased in a straightforward manner by introducing additional channels between existing ITU grid channels using interleavers.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

In the drawings:

FIGS. 3 A-B are respectively the eye diagrams of a 42.7-Gb/s NRZ-DBPSK signal after demodulation by an O-1bit-DI, and an ODI in accordance with an embodiment of the present invention;

FIGS. 4 A-B are respectively the eye diagrams of a 42.7-Gb/s RZ-DBPSK signal (with 67% duty-cycle) after demodulation by an O-1bit-DI, and an ODI in accordance with an embodiment of the present invention;

FIGS. 5 A-B are respectively the eye diagrams of a 42.7-Gb/s duobinary signal obtained after demodulation of an NRZ-DBPSK signal by an O-1bit-DI, and an ODI in accordance with an embodiment of the present invention;

DETAILED DESCRIPTION OF THE INVENTION

Figure 1:
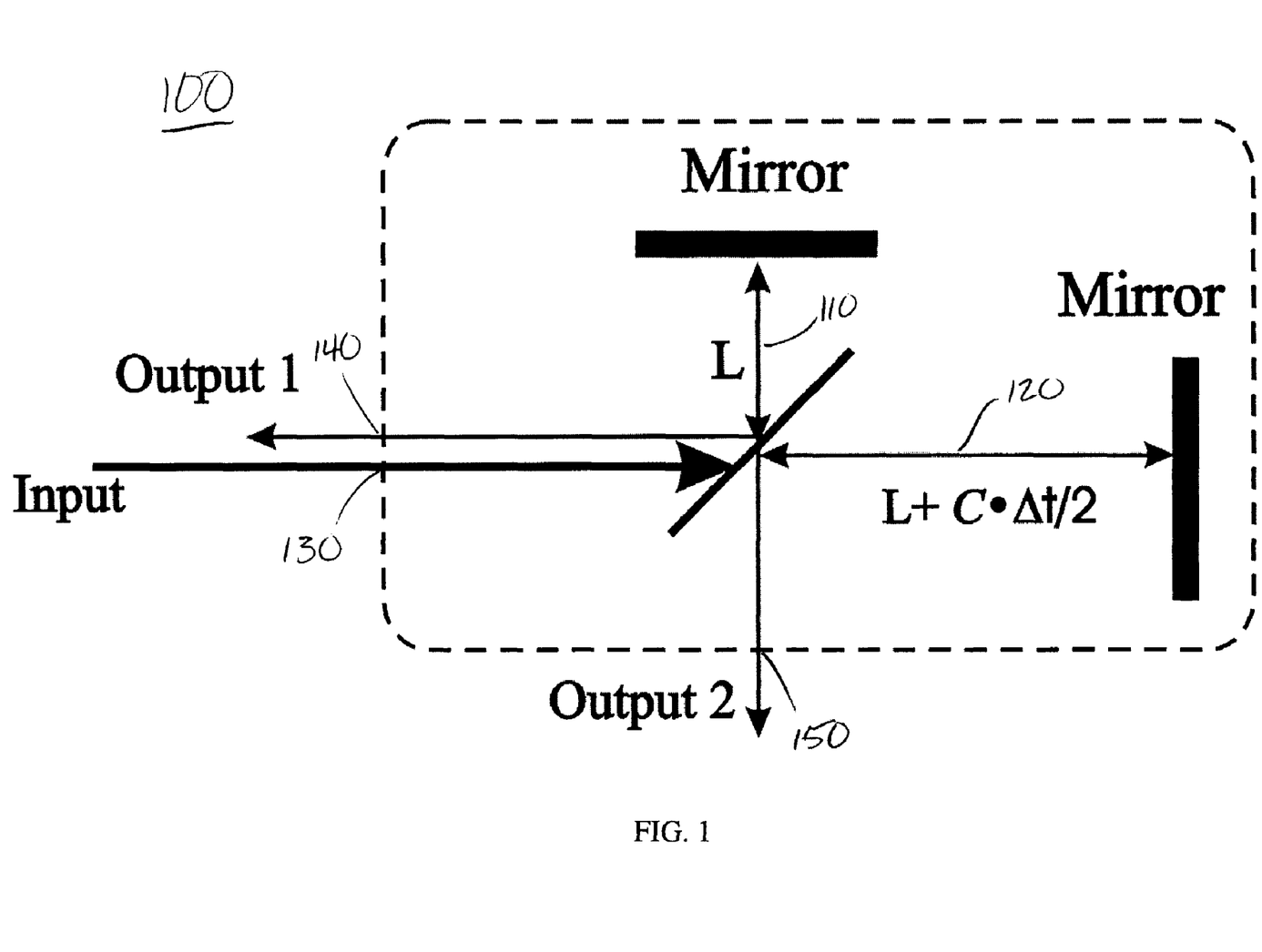
FIG. 1 is a diagram depicting an apparatus for an ODI in accordance with an embodiment of the present invention.

An ODI 100 according to one preferred embodiment of the invention is shown in FIG. 1. The free spectral range (FSR) of the ODI 100 is:

$$FSR = \frac{1}{\Delta t}.$$

For example, a FSR=50 GHz (e.g. a 50-GHz-ODI) requires a delay ($\Delta t$)=20 ps. It is recognized that the FSR of an ODI for demodulating optical DPSK signals is not necessarily equal to the SR of the DPSK signal, while still providing acceptable demodulation performance. The FSR and SR can differ by about ±25% without causing a substantial demodulation penalty. The FSR for an ODI according to the invention is thus preferably between about 0.8SR and 1.3SR, or:

(0.8×SR)<FSR<(1.3×SR).

To properly align the transmittance spectrum of the ODI, the delay, $\Delta t$, should satisfy:

$\omega_0 \Delta t = M\pi$, where, for example, $\omega_0=2\pi \times 193.100$ THz (193.100 THz being the reference frequency of the ITU grid), and M is a large integer (e.g. for $\Delta t$=20 ps delay, M is about 7724. M can vary (e.g. +/−8) when $\Delta t$ is allowed to vary by about $1 \times 10^{-3}$).

The ODI 100 preferably has one input port 130 and two output ports 140, 150 (Output 1, Output 2) which are commonly referred to as the constructive and the destructive ports. If a DBPSK signal is input into the ODI 100, the output signal from the constructive port is a signal having an optical duobinary format, and the output signal from the destructive port is a signal having an alternate mark inversion (AMI) format.

Preferably, the ODI 100 is athermal, and based on a free-space optical design (as shown in FIG. 1), so that its passband does not drift with temperature, and thus, does not require any temperature stabilization.

To limit the frequency offset induced demodulation penalty for DBPSK signal transmission to less than 1 dB, the frequency offset (i.e. the frequency difference between the center frequency of an optical signal and the corresponding transmittance peak location of the ODI) is preferably within about ±5% of the bit rate (e.g. ±2 GHz for 40 Gb/s signals). It is noted that when demodulating a 40-Gb/s DBPSK signal, an ODI according to the present invention outperforms an O-1bit-DI with regard to tolerance to the frequency offset since the differential length is shorter than that of the O-1bit-DI. Thus, it is beneficial to set the FSR of an ODI to be larger than the SR to achieve a higher tolerance to the frequency drift (due to signal laser frequency drift and/or ODI passband misalignment). Preferably, the FSR is between about 1.1SR and about 1.3SR, or:

(1.1×SR)<FSR<(1.3×SR).

For example, with SR=42.7 Gb/s and FSR=50 GHz ($\Delta t$=20 ps), we have FSR=1.17 SR. In this case, we set the maximum tolerable frequency offset to be about ±4 GHz (for a penalty of about 2 dB). The corresponding maximum offset of the phase difference of the two paths of the ODI is then $2\pi \times 4$ GHz×20 ps≈$\pi/6$.

It is also noted that the temperature variations may also produce an additional frequency offset. A typical operating temperature range for telecommunication devices is from 0 to 70° C. Thus, the temperature dependent frequency drift of an ODI according to the invention is preferably less than about 0.05 GHz/° C., which can be realized using athermal designs, discussed above.

Figure 2:
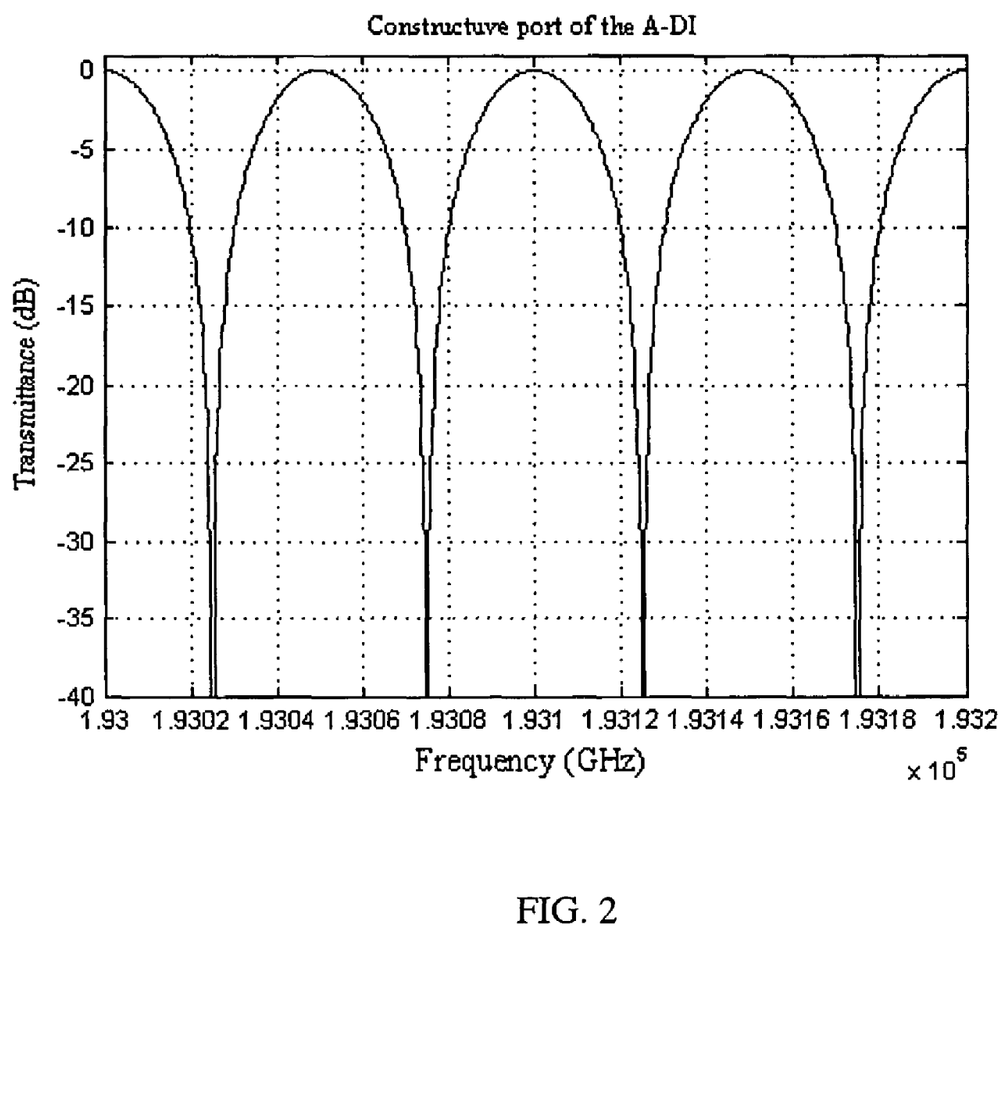
FIG. 2 is plot showing the transmittance at the constructive port of an ODI in accordance with an embodiment of the present invention.

FIG. 2 shows the transmission curve (i.e. transmittance vs. frequency) at a constructive port of an ODI (e.g. ODI 100) of one embodiment of the invention. It can be understood from the figure that for this ODI (a 50-GHz-ODI) the transmittance peaks are locked onto the 50 GHz ITU grid (i.e. spaced apart by 50 GHz with each peak located at a frequency which is a multiple of 50 GHz from the reference frequency 193.100 THz). Those skilled in the art can appreciate that such an ODI can be used to demodulate any channel on the ITU grid.

Figure 3A:
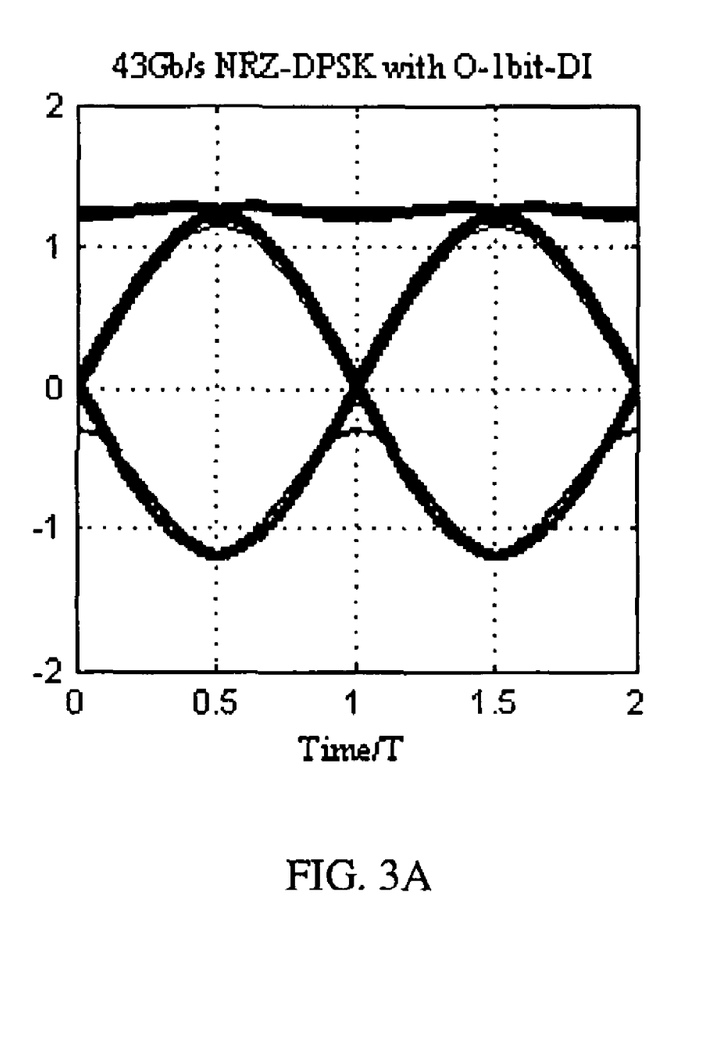
Figure 3B:
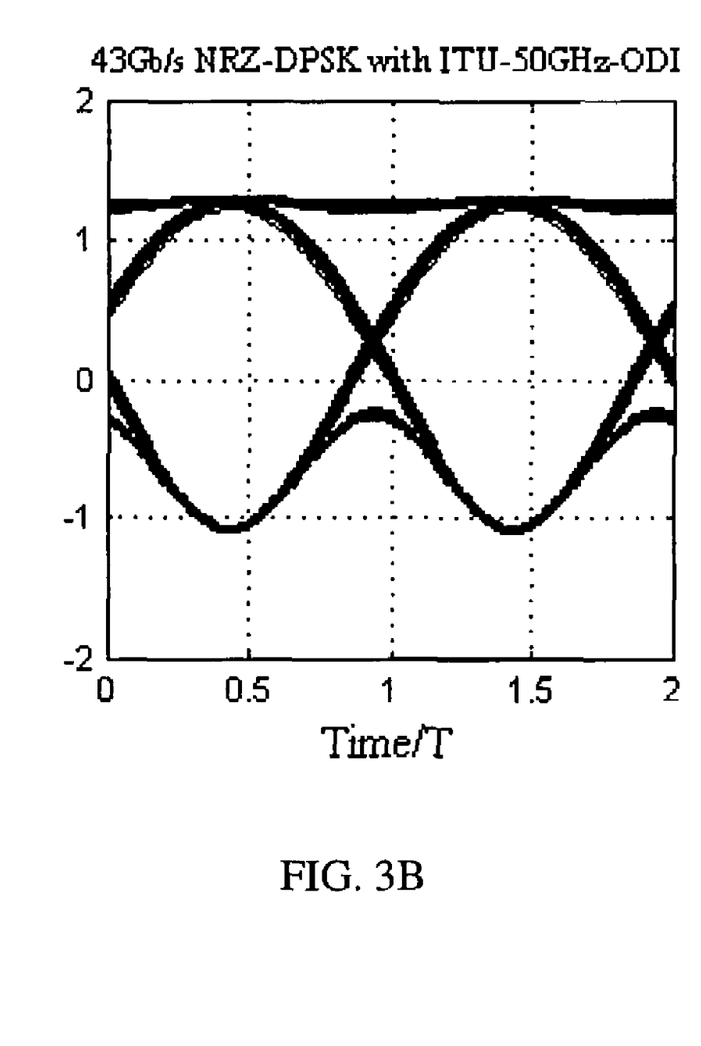

Simulations were conducted to compare a 42.7-Gb/s NRZ-DBPSK signal transmission using prior art O-1bit-DI, and a 50-GHz-ODI according to embodiments of the invention. FIGS. 3 A-B are respectively the eye diagrams of a 42.7-Gb/s NRZ-DBPSK signal after demodulation by an O-1bit-DI, and a 50-GHz-ODI, followed by balanced detection. It can be understood from FIGS. 3 A-B that the eye closure penalty for NRZ-DBPSK signal transmission using a 50-GHz-ODI (having a non-exact delay of 1 bit period) is negligible.

Figure 4A:
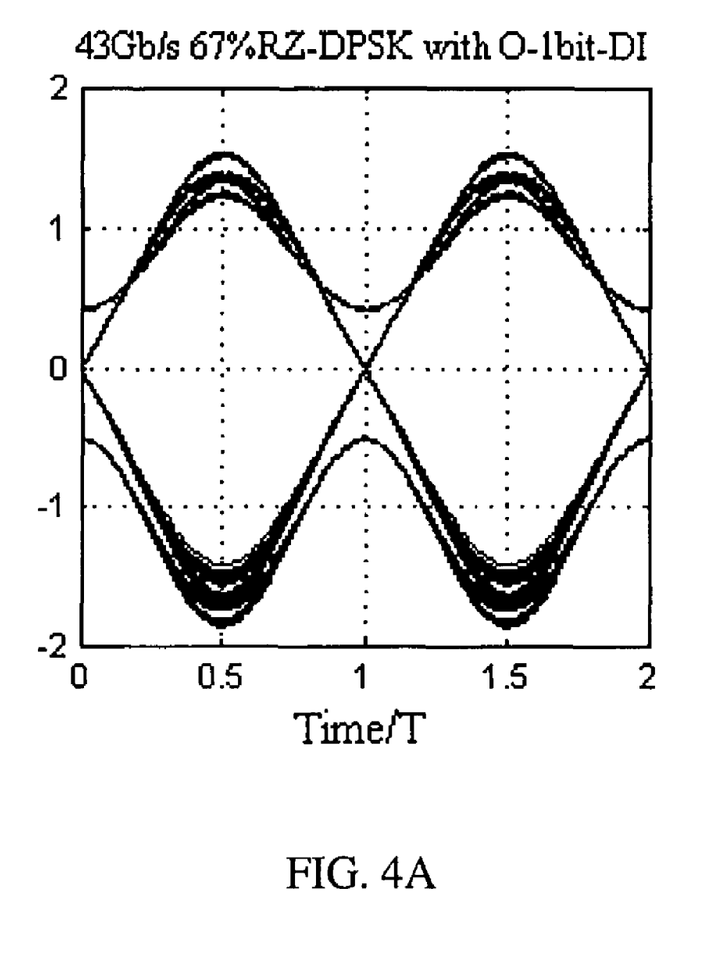
Figure 4B:
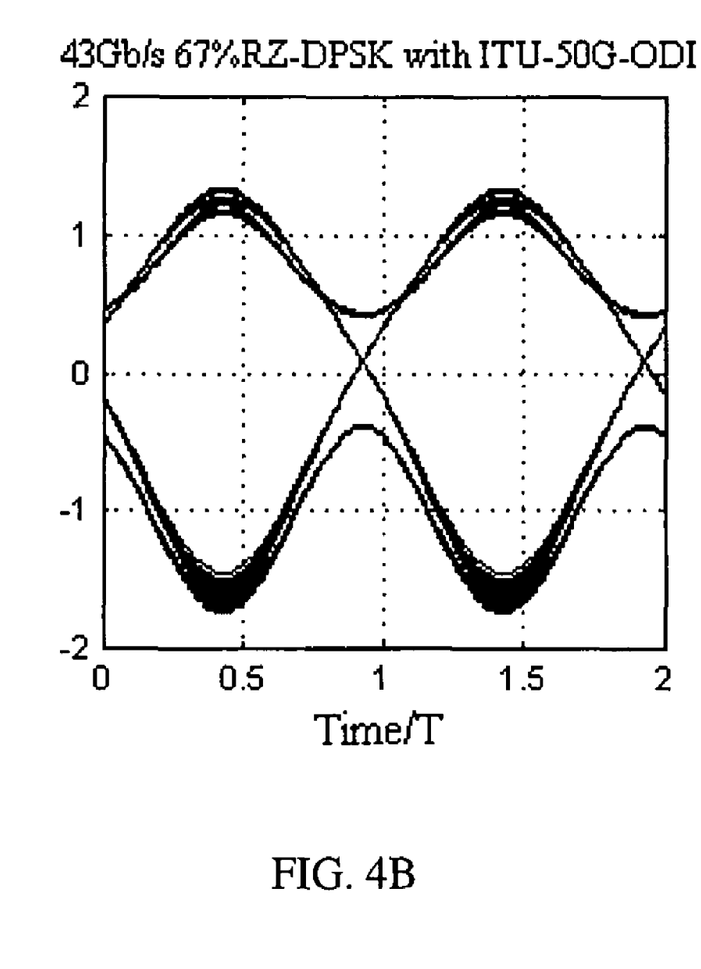

FIGS. 4 A-B are respectively the eye diagrams of a 42.7-Gb/s RZ-DBPSK signal (with 67% duty-cycle) after demodulation by an O-1bit-DI, and a 50-GHz-ODI according to embodiments of the invention, followed by balanced detection. As with the simulations discussed above, it can be understood from FIGS. 4 A-B that the eye closure penalty for RZ-DBPSK signal transmission using a 50-GHz-ODI is negligible.

Figure 5A:
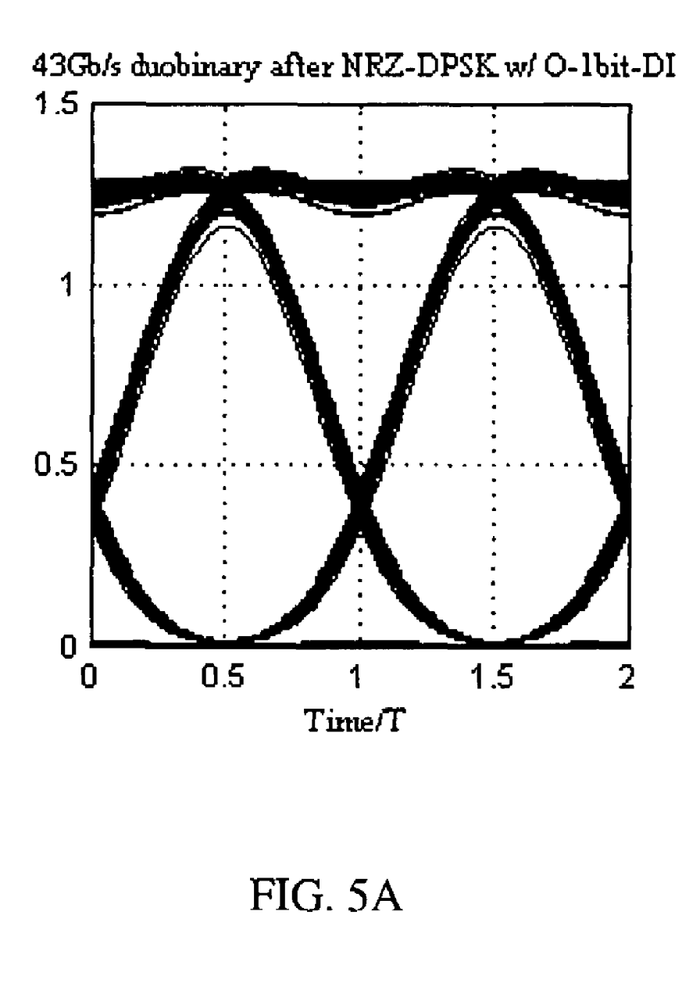
Figure 5B:
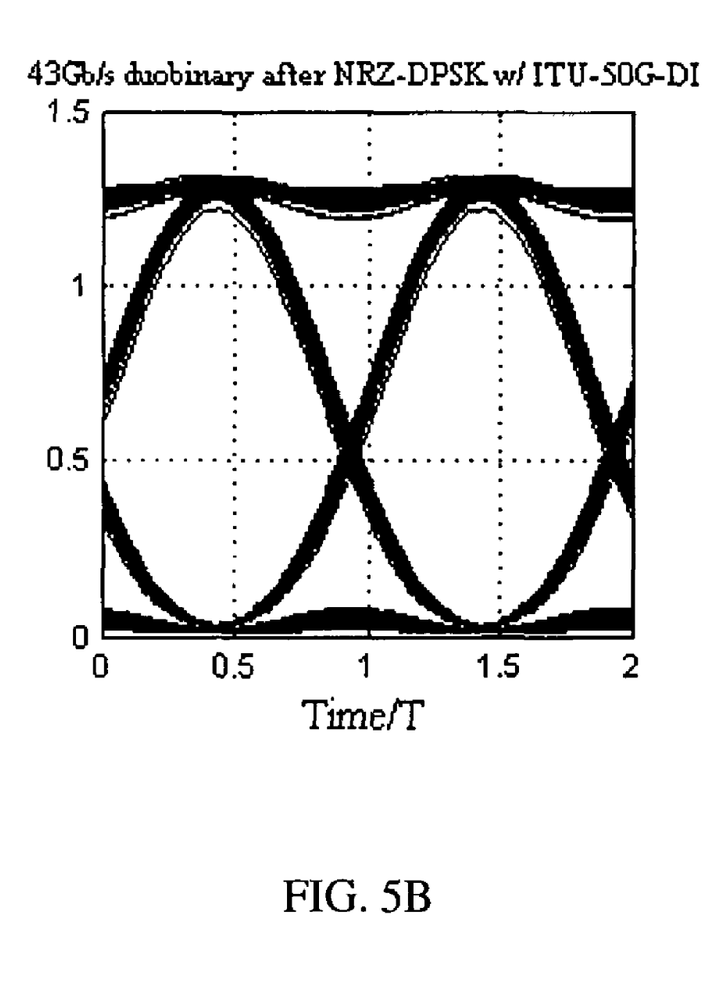

FIGS. 5 A-B are respectively the eye diagrams of a 42.7-Gb/s duobinary signal obtained after demodulation of a NRZ-DBPSK signal by an O-1bit-DI, and a 50-GHz-ODI according to embodiments of the invention. As with the simulations discussed above, the eye closure penalty of the 50-GHz-ODI is negligible. In addition, it is noted that the duobinary signal generated using the 50-GHz-ODI has improved the chromatic dispersion tolerance as compared to the O-1bit-DI.

Figure 6:
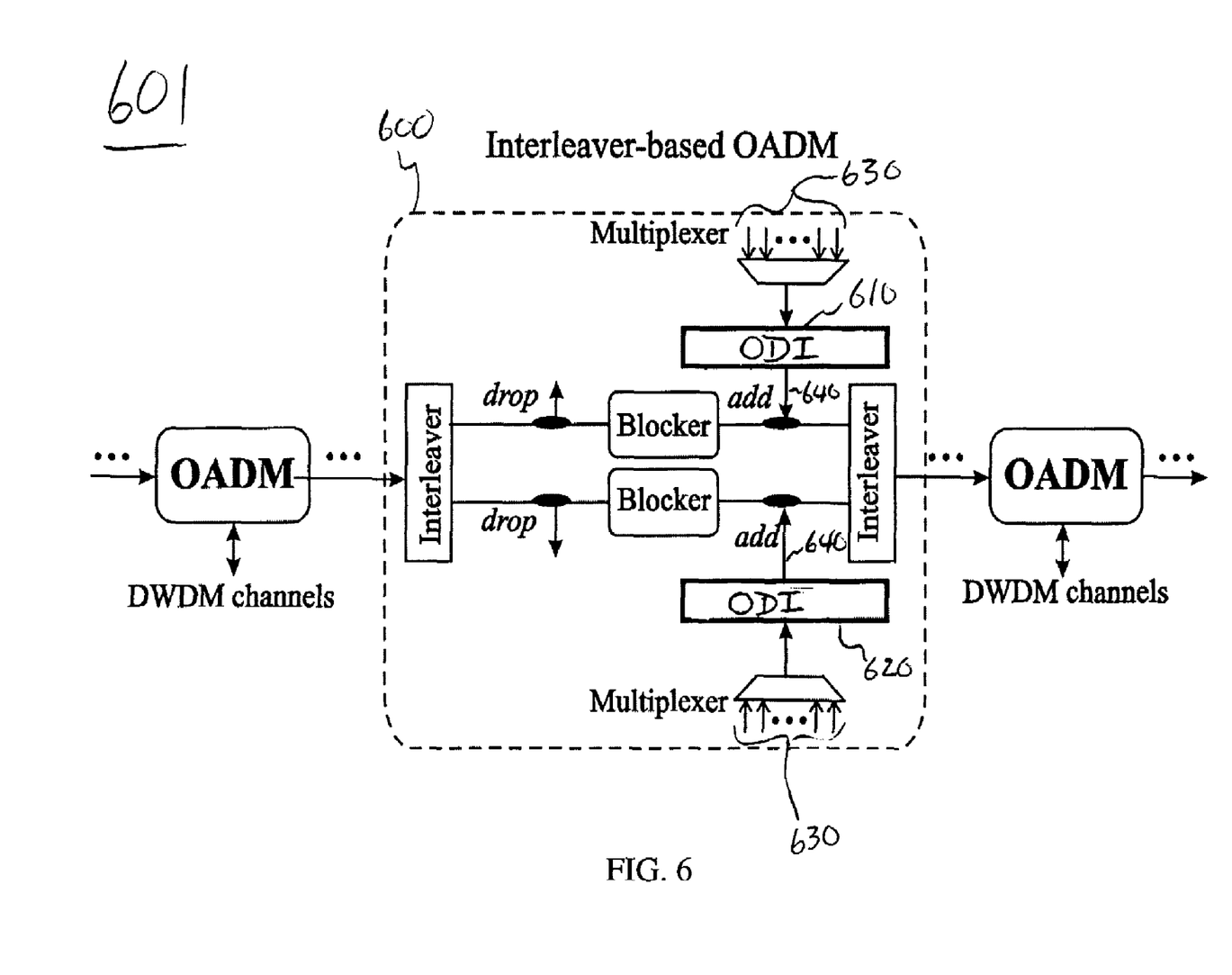
FIG. 6 is a diagram depicting an optical add/drop multiplexer (OADM) with ODIs for simultaneously converting multiple DBPSK signals into optical duobinary signals in accordance with an embodiment of the present invention.

An ODI according to the present invention can also be beneficially employed to demodulate multiple channels of a WDM signal from a transmitter or to a receiver. As can be understood from FIG. 6, which depicts an exemplary OADM 600 of a WDM transmission system 601, ODI's 610, 620 can be used to simultaneously convert multiple WDM channels of DBPSK signals 630 into optical duobinary signals 640 for transmission. When an ODI (610, 620) is shared by a group of DBPSK channels 630 from a transmitter, optical duobinary signals 640 are transmitted across the transmission system 601, and conventional receivers used for on-off-keying (OOK) can be used for signal detection.

Figure 7:
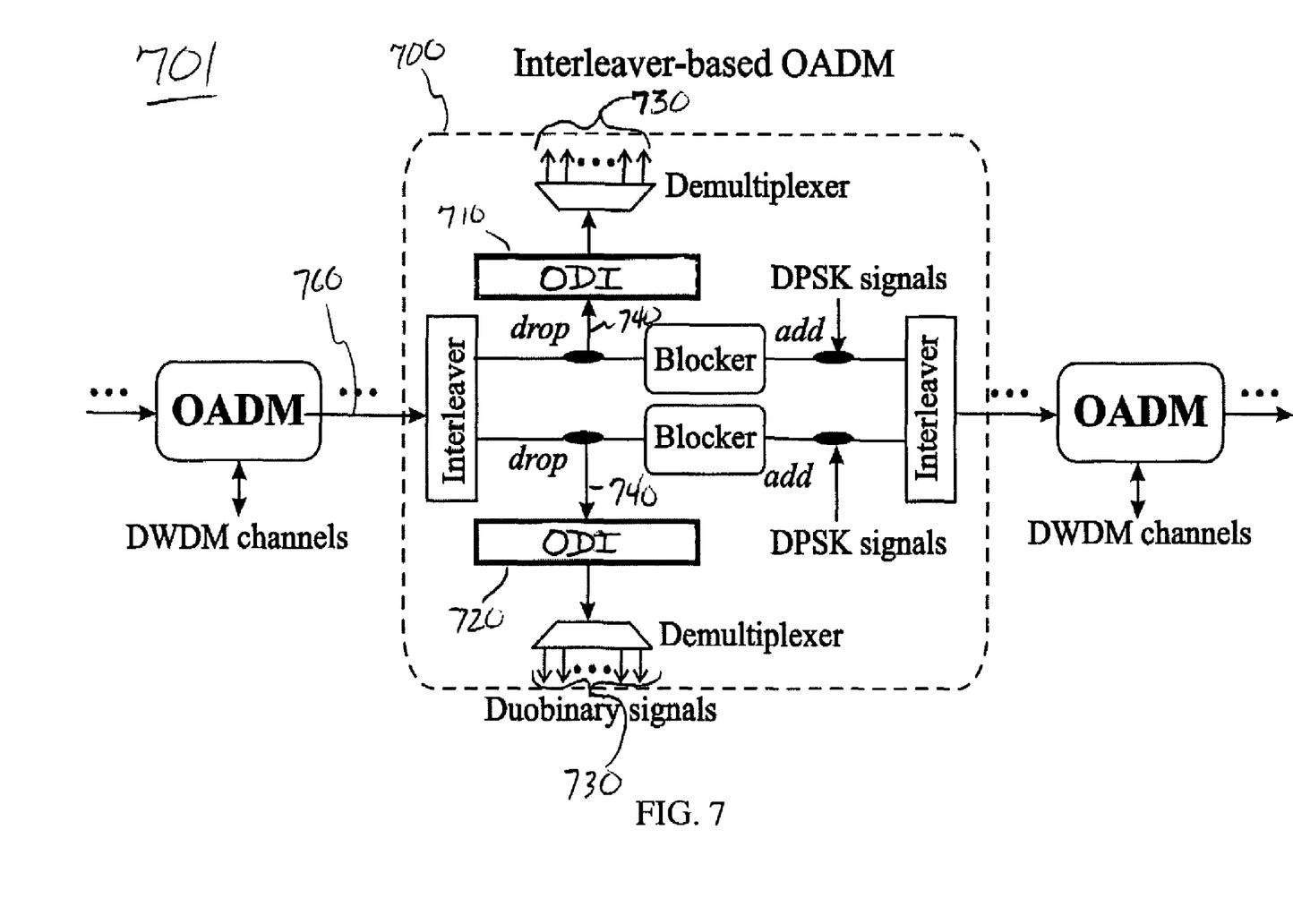
FIG. 7 is a diagram depicting an OADM with ODIs for simultaneously converting multiple. DBPSK signals into optical duobinary signals in accordance with an embodiment of the present invention.

In an alternative embodiment of the invention shown in FIG. 7, ODI's 710, 720 are employed to convert multiple WDM channels of DBPSK signals 740 transmitted over a transmission link 760 into duobinary signals 730 for reception/conventional OOK detection.

Figure 8:
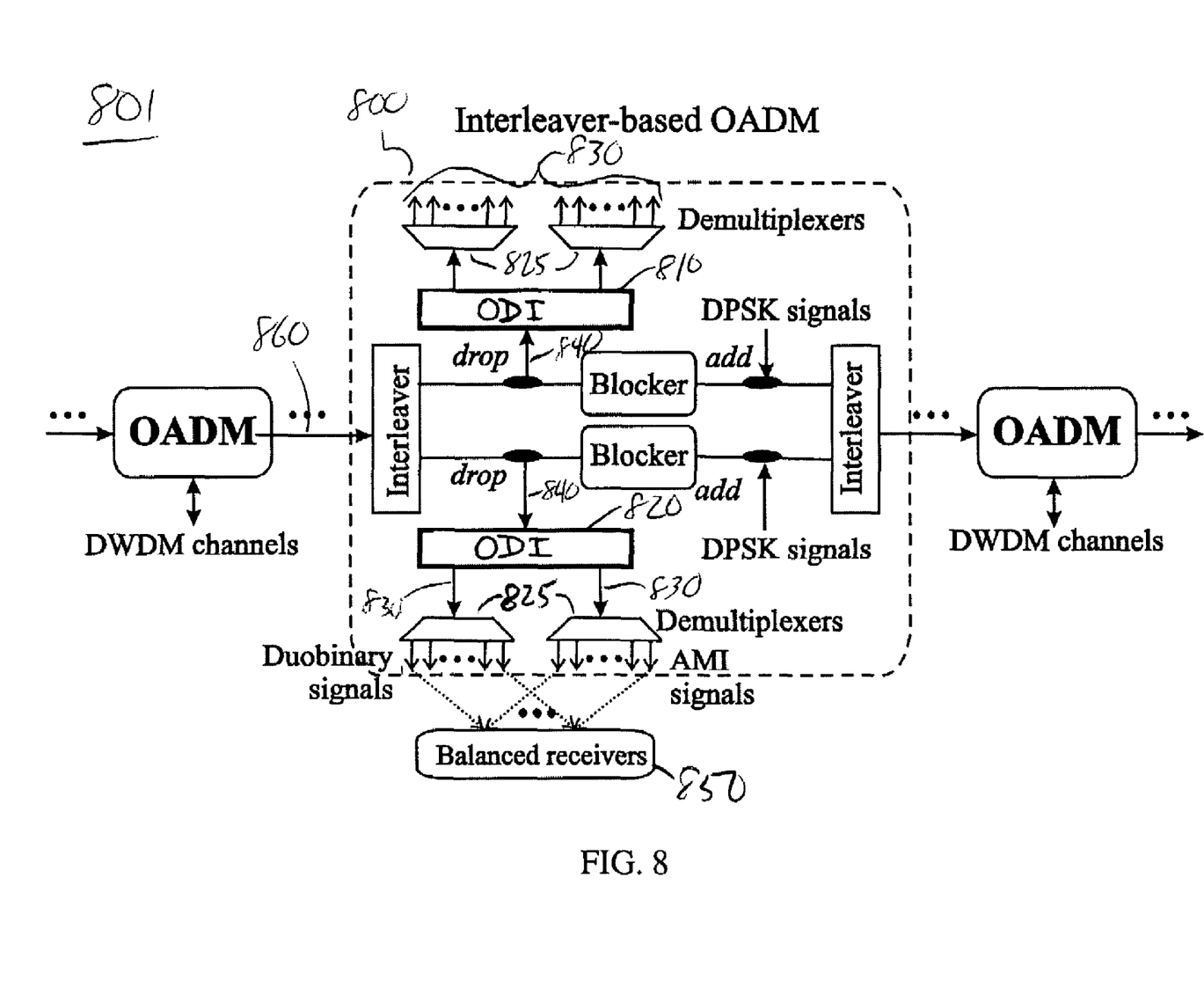
FIG. 8 is a diagram depicting an OADM with ODIs for simultaneously receiving multiple DBPSK signals through balanced detection in accordance with an embodiment of the present invention.

In another alternative embodiment of the invention shown in FIG. 8, ODI's 810, 820 are employed to convert multiple WDM channels of DBPSK signals 840 transmitted over a transmission link 860 into duobinary and AMI signals 830 for reception/balanced OOK detection. Two demultiplexers 825 are coupled to each ODI 810, 820 to generate two complementary signals for each WDM channel. The complementary signals can be aligned and received by balanced receivers 850 (thus realizing the 3-dB receiver sensitivity advantage of DBPSK over OOK).

To ensure that the frequency offset of ODI's according to the present invention is less than 4 GHz over the entire wavelength band of a WDM system, the FSR is preferably accurately controlled. The commonly used C-band covers the frequency range from 191.000 THz to 195.950 THz. Assuming the frequency offset is strictly zero at 193.100 THz, and it is ±4 GHz at the edge frequency 195.950 THz, we find that the maximum relative error of the FSR should be about:

$$\left|\frac{\Delta FSR}{FSR}\right| = \frac{0.004}{195.950 - 193.100} \approx 1.4 \times 10^{-3}.$$

This means the time delay $\Delta t$ needs to be controlled within an accuracy of about 28 fs.

To generalize the above analysis, if the FSR is chosen to be $50/2^N$ GHz (where N is a non-negative integer: N=0, 1, 2, 3, ...), and if the maximum frequency offset is 8% of the FSR, the maximum relative error of the FSR should be about:

$$\left|\frac{\Delta FSR}{FSR}\right| = \frac{0.004/2^N}{195.950 - 193.100} \approx \frac{1.4}{2^N} \times 10^{-3}.$$

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims.

We claim:

1. A method of decoding optical signals comprising:
propagating an optical signal through an athermal optical delay interferometer (ODI) to demodulate the optical signal;
wherein the delay between optical paths of the ODI is selected such that:

FSR=50 GHz/$2^N$, and (0.8×SR)<FSR<(1.3×SR), where FSR is the free spectral range of the ODI, SR is the symbol rate of the optical signal, and N is a non-negative integer: N=0, 1, 2, 3, . . . .

2. The method of claim 1, wherein the optical signal is a multichannel optical signal and the ODI simultaneously demodulates multiple channels of the multichannel optical signal.

3. The method of claim 2, wherein the maximum error of the FSR $$\left|\frac{\Delta FSR}{FSR}\right|$$

is less than $$\frac{1.4}{2^N} \times 10^{-3}.$$

4. The method of claim 1, wherein the ODI is non-tunable.

5. The method of claim 1, wherein the temperature-dependent frequency drift of the ODI is less than about 0.05 GHz/° C.

6. The method of claim 1, wherein the ODI is adapted to produce a phase difference between the optical paths of the ODI, which is a multiple of π, within an accuracy of ±π/6 at 193.100 THz.

7. The method of claim 1, wherein the FSR of the ODI is between about 1.1SR and about 1.3SR.

8. The method of claim 1, wherein the optical signals are differential binary phase shift keyed optical signals.

9. The method of claim 1, wherein the optical signals are 40-Gb/s differential binary phase shift keyed optical signals, and the FSR of the ODI is 50 GHz.

10. The method of claim 1, wherein the optical signals are 10-Gb/s differential binary phase shift keyed optical signals, and the FSR of the ODI is 12.5 GHz.

11. The method of claim 1, wherein the optical signals are differential quadrature phase shift keyed optical signals.

12. The method of claim 1, wherein the optical signals are 40-Gb/s differential quadrature phase shift keyed optical signals, and the FSR of the ODI is 25 GHz.

13. The method of claim 1, wherein the optical signals are 80-Gb/s differential quadrature phase shift keyed optical signals, and the FSR of the ODI is 50 GHz.

14. An optical communication system for transmitting optical signals comprising:
an optical add-drop multiplexer (OADM) including an athermal optical delay interferometer (ODI) adapted to provide a delay between optical paths of the delay interferometer such that:

FSR=50 GHz/$2^N$, and (0.8×SR)<FSR<(1.3×SR), where FSR is the free spectral range of the ODI, SR is the symbol rate of the optical signals, and N is a non-negative integer: N=0, 1, 2, 3, . . . .

15. The system of claim 14, wherein the optical signals are multichannel optical signals and the ODI simultaneously demodulates multiple channels of the multichannel optical signals.

16. The system of claim 14, wherein the ODI is coupled to the OADM to convert differential binary phase shift keyed optical signals to duobinary signals for addition to the transmitted optical signals.

17. The system of claim 14, wherein the ODI is coupled to the OADM to demodulate transmitted differential binary phase shift keyed optical signals.

18. The system of claim 14, wherein the optical signals are multichannel optical signals, and wherein each channel of the multichannel optical signals is received by a balanced detector.

19. The system of claim 14, wherein the optical signals are 40-Gb/s differential binary phase shift keyed optical signals and the FSR of the ODI is 50 GHz.

20. The system of claim 14, wherein the ODI is adapted to produce a phase difference between the optical paths of the ODI, which is a multiple of $\pi$, within an accuracy of $\pm\pi/6$ at 193.100 THz.

21. The system of claim 14, wherein the center frequencies of the optical signals are a multiple of $50\ \text{GHz}/2^N$ from 193.100 THz, within an accuracy of $\pm 4\ \text{GHz}/2^N$.

22. The system of claim 14, wherein the FSR of the ODI is between about 1.1SR and about 1.3SR.

23. An athermal optical delay interferometer (ODI) apparatus for demodulating optical signals having a symbol rate SR comprising:
two optical paths for imparting a delay between optical signals propagated along the optical paths, wherein the delay is selected such that:

$\text{FSR}=50\ \text{GHz}/2^N$, and $(0.8 \times \text{SR}) < \text{FSR} < (1.3 \times \text{SR})$, where FSR is the free spectral range of the ODI, SR is the symbol rate of the optical signals, and N is a non-negative integer: N=0, 1, 2, 3, . . . .

24. The apparatus of claim 23, wherein the optical signals are 40-Gb/s differential binary phase shift keyed optical signals, and the FSR of the ODI is 50 GHz.

25. The apparatus of claim 23, wherein the ODI is non-tunable.

26. The apparatus of claim 23, wherein the temperature-dependent frequency drift of the athermal ODI is less than about 0.05 GHz/° C.

27. The apparatus of claim 23, wherein the ODI is adapted to produce a phase difference between the optical paths of the ODI, which is a multiple of $\pi$, within an accuracy of $\pm\pi/6$ at 193.100 THz.

28. The apparatus of claim 23, wherein the FSR is between about 1.1SR and about 1.3SR.

29. The apparatus of claim 23, wherein the optical signals are multichannel optical signals and the ODI apparatus simultaneously demodulates multiple channels of the multichannel optical signals.

* * * * *